US010845966B2

(12) United States Patent
Shah

(10) Patent No.: US 10,845,966 B2
(45) Date of Patent: *Nov. 24, 2020

(54) USER INTERACTION PROCESSING IN AN ELECTRONIC MAIL SYSTEM

(71) Applicant: Microsoft Technology Licensing, LLC, Redmond, WA (US)

(72) Inventor: Sayali Shah, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 32 days.

This patent is subject to a terminal disclaimer.

(21) Appl. No.: 16/247,918

(22) Filed: Jan. 15, 2019

(65) Prior Publication Data

US 2019/0146650 A1 May 16, 2019

Related U.S. Application Data

(63) Continuation of application No. 15/333,558, filed on Oct. 25, 2016, now Pat. No. 10,216,379.

(51) Int. Cl.
| | |
|---|---|
| *G06F 3/0484* | (2013.01) |
| *G06Q 10/10* | (2012.01) |
| *G06F 3/0482* | (2013.01) |
| *H04L 12/58* | (2006.01) |
| *H04L 29/08* | (2006.01) |
| *G06F 16/951* | (2019.01) |
| *G06F 17/00* | (2019.01) |

(52) U.S. Cl.
CPC .......... *G06F 3/0484* (2013.01); *G06F 3/0482* (2013.01); *G06Q 10/107* (2013.01); *H04L 51/04* (2013.01); *H04L 67/02* (2013.01); *H04L 67/22* (2013.01); *G06F 16/951* (2019.01); *G06Q 10/10* (2013.01); *H04L 51/16* (2013.01)

(58) Field of Classification Search
CPC .. G06F 10/107; G06F 10/10; G06F 17/30864; G06F 3/0482; G06F 3/0484; G06F 16/951; H04L 51/16; H04L 67/02; H04L 51/04; H04L 67/22; G06Q 10/107; G06Q 10/10

See application file for complete search history.

(56) References Cited

U.S. PATENT DOCUMENTS

| | | | |
|---|---|---|---|
| 8,584,124 B2 | 11/2013 | Fee et al. | |
| 8,996,837 B1 | 3/2015 | Bono et al. | |
| 2009/0144743 A1* | 6/2009 | Wolslegel | G06Q 10/107 |
| | | | 718/105 |

(Continued)

OTHER PUBLICATIONS

"Final Office Action Issued in U.S. Appl. No. 14/874,137", dated Dec. 30, 2019, 14 Page.

(Continued)

*Primary Examiner* — Quoc A Tran
(74) *Attorney, Agent, or Firm* — Christopher J. Volkmann; Kelly, Holt & Christenson, PLLC

(57) ABSTRACT

An e-mail system identifies actions or activities that a user takes relative to an e-mail message. The activity is logged as an activity log entry in an activity log. When the user accesses the activity log, the activities and corresponding e-mail messages are accessible to the user through the activity log entry, along with a user interface element that allows the user to take additional actions with respect to the e-mail message in the activity log entry.

20 Claims, 12 Drawing Sheets

(56) References Cited

U.S. PATENT DOCUMENTS

| | | | |
|---|---|---|---|
| 2013/0067540 A1 | 3/2013 | Mukkara et al. | |
| 2013/0347095 A1 | 12/2013 | Barjatiya et al. | |
| 2015/0188870 A1* | 7/2015 | Sharp .................... | H04L 51/22 |
| | | | 715/752 |
| 2016/0085772 A1 | 3/2016 | Vermeulen et al. | |
| 2016/0261684 A1 | 9/2016 | Khalaf et al. | |
| 2017/0373995 A1* | 12/2017 | Panchapakesan ....... | H04L 67/20 |

OTHER PUBLICATIONS

"Non Final Office Action Issued in U.S. Appl. No. 14/874,137", dated Apr. 18, 2019, 15 Pages.

"Notice of Allowance Issued in U.S. Appl. No. 14/874,137", dated Mar. 4, 2020, 9 Pages.

* cited by examiner

USER INTERACTION PROCESSING IN AN ELECTRONIC MAIL SYSTEM

CROSS-REFERENCE TO RELATED APPLICATION

The present application is a continuation of and claims priority of U.S. patent application Ser. No. 15/333,558, filed Oct. 25, 2016, the content of which is hereby incorporated by reference in its entirety.

BACKGROUND

Computer systems are currently in wide use. Some such computer systems are used to run electronic mail (e-mail) systems.

Some e-mail systems are hosted in a remote server environment (such as in the cloud or another environment) and are accessed by users who are using client devices. The client devices may be mobile devices, desktop or laptop computers, etc. Some such e-mail systems are web-based e-mail systems. This means that the users are accessing the hosted e-mail systems through a web browser that runs on the client device or elsewhere.

To do so, the user often launches a web browser and then navigates to a site where the e-mail system (or service) is hosted, to perform e-mail operations. The user can perform operations such as authoring an e-mail message, sending an e-mail message, reading an e-mail message, deleting or archiving an e-mail message, arranging folders, moving an e-mail message to a particular folder, setting filters, flagging an e-mail message, replying to an e-mail message, among a wide variety of other things.

The discussion above is merely provided for general background information and is not intended to be used as an aid in determining the scope of the claimed subject matter.

SUMMARY

An e-mail system identifies actions or activities that a user takes relative to an e-mail message. The activity is logged as an activity log entry in an activity log. When the user accesses the activity log, the activities and corresponding e-mail messages are accessible to the user through the activity log entry, along with a user interface element that allows the user to take additional actions with respect to the e-mail message in the activity log entry.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Email systems can be systems that use mobile native email client systems, desktop email client systems and/or they can be web-based systems. Web-based systems allow a user to navigate to a site hosting the e-mail system through a web browser, and perform e-mail activities or actions or functions within the e-mail system, through the web browser. It is not uncommon in any of these types of systems for a user to wish to view recent activities that he or she has taken in the e-mail system. For instance, it may be that a user is going through his or her inbox and deleting unwanted messages. It may be that the user has deleted, for instance, 10 messages, but now the user wishes to go back and review one of the previously deleted messages. In a web-based or other system, the user is often unable to do this in an effective way. The present discussion proceeds in the context of the email system being a web-based system. However, it can just as easily apply to a desktop email client and/or a mobile native email client. These are all contemplated herein.

The user can use backstacking functionality in the web browser to reach the previous state in the browser, and thus to reach the previous e-mail that the user was just interacting with. However, backstacking poses significant limitations. For instance, if the user opens a new browser widow, he or she loses the backstacking history. In addition, backstacking does not keep track of which types of actions have been taken with respect to the email message that the user previously interacted with. For instance, the backstacking history may provide no indication as to whether the user flagged the e-mail message, deleted it, replied to it, etc.

In addition, if a user wishes to undo any of his or her previous actions, the user cannot do this through backstacking. By way of example, assuming that the user has deleted 10 e-mails in a row, and the user now wishes to undo deletion of the third e-mail message, this is not currently possible by using backstacking functionality.

The present discussion thus proceeds with respect to describing an activity log generation system that maintains an activity log that identifies particular e-mail messages, and user actions or activities that were taken with respect to those messages. The system can also provide user actuable elements that can be used to interact with entries in the activity log, such as to undo the actions or activities relative to a given e-mail message, among other things.

Figure 1:
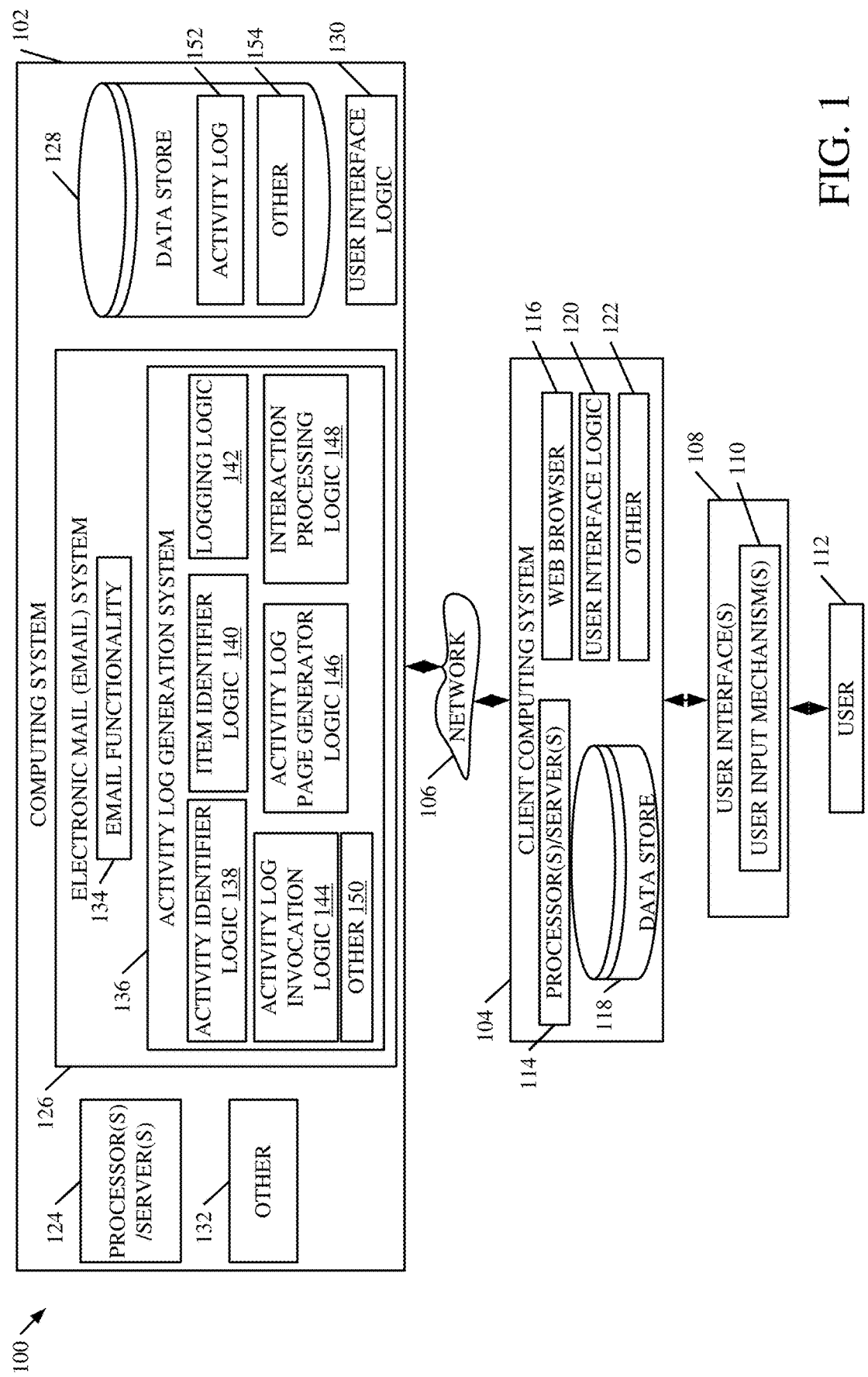
FIG. 1 is a block diagram of one example of a computing system architecture.

FIG. 1 is a block diagram of one example of a computing system architecture 100. Architecture 100 includes computing system 102 that can be accessed by client computing system 104 over network 106. FIG. 1 also shows that client computing system 104 can generate or present one or more user interfaces 108 with user input mechanisms 110, for interaction by user 112. User 112 illustratively interacts with the user input mechanisms 110 to control and manipulate client computing system 104 and computing system 102.

In the example illustrated in FIG. 1, client computing system 104 illustratively includes one or more servers or processors 114, web browser 116, data store 118, user interface logic 120, and it can include a wide variety of other functionality 122. User 112 can interact with user input mechanisms 110 in order to launch and use web browser 116 that is run by client computing system 104.

In the example shown in FIG. 1, computing system 102 illustratively includes one or more processors or servers 124, electronic mail (e-mail) system 126, data store 128 (which can include activity log 152 and other items 154), user interface logic 130, and it can include a wide variety of other functionality or other items 132. E-mail system 126 illustratively includes e-mail functionality 134 that allows user 112, once he or she has navigated to e-mail system 126 using web browser 116, to perform a wide variety of e-mail functions. Such functions can include authoring, sending, and replying to electronic mail messages, deleting messages, arranging folders, flagging messages, setting filters, and a wide variety of other functions.

E-mail system 126 also illustratively includes activity log generation system 136. It will be noted that an example in which system 136 and activity log 152 are located on the server side is only one example, and system 126 and/or log 152 can be client side items as well. When located on client computing system 104, then they may only be available for that client (or user session). This is contemplated herein. However, the remaining discussion will be in the context of system 136 and log 152 being server side items. The discussion can just as easily apply to them being client side as well, and this is contemplated herein.

System 136, itself, illustratively includes activity identifier logic 138, item identifier logic 140, logging logic 142, activity log invocation logic 144, activity log page generator logic 146, interaction processing logic 148, and it can include other items 150. Activity identifier logic 138 illustratively identifies any activities or actions that user 112 takes with respect to any e-mail messages in e-mail system 126. Item identifier logic 140 identifies the particular e-mail message corresponding to that activity or action, and logging logic 142 generates an activity log entry in activity log 152 in data store 128. The activity log entry identifies the email message, the user activity or action taken relative to that email message, and it can also include a user actuatable element or other items.

Activity log invocation logic 144 illustratively detects when user 112 has indicated that he or she wishes to view or interact with the activity log 152. Activity log page generator logic 146 then generates an activity log page indicative of the entries in the activity log 152, and surfaces that page (such as through user interface logic 130 and web browser 116) for review and interaction by user 112. Interaction processing logic 148 illustratively detects user interaction with user actuatable elements on the activity log page, and performs processing based upon the detected user interaction. These are all described in greater detail below.

Figure 2:
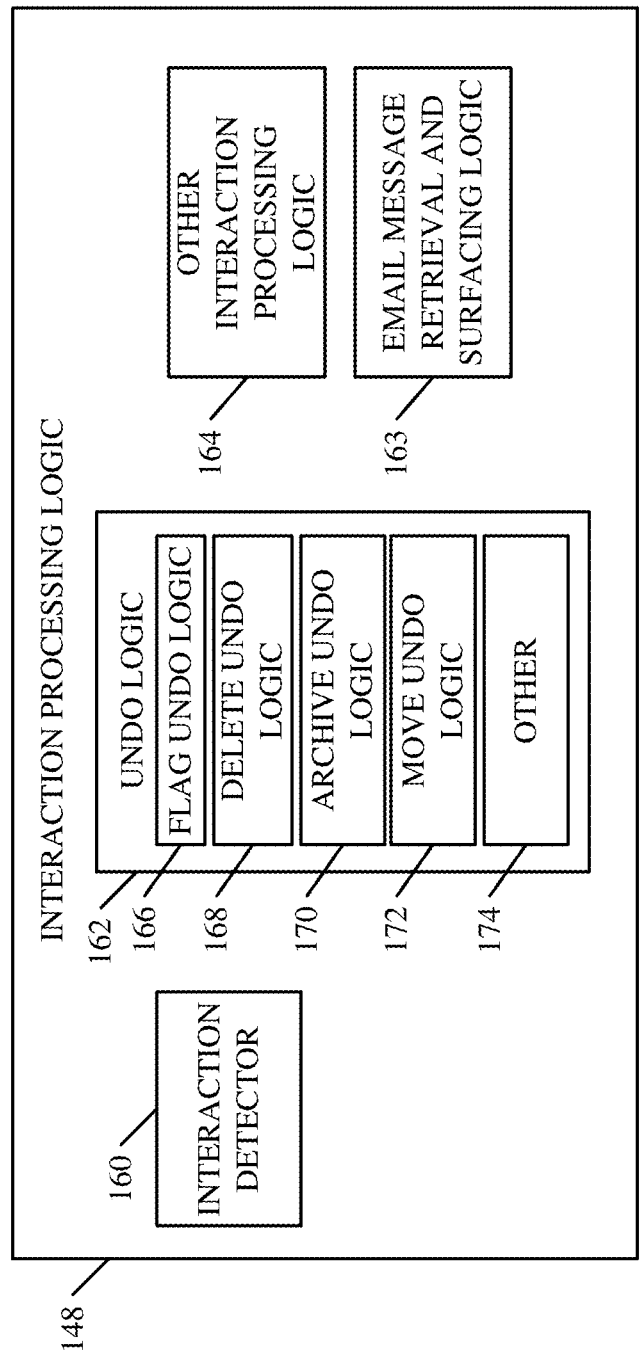
FIG. 2 is a block diagram showing one example of interaction processing logic in more detail.

FIG. 2 is a block diagram showing one example of interaction processing logic 148, in more detail. In the example shown in FIG. 2, logic 148 illustratively includes interaction detector 160, undo logic 162, and other interaction processing logic 164. Recall that interaction processing logic 148 illustratively detects user interactions with the activity log page after the user has requested that the activity log page be surfaced. The interactions can be any of a wide variety of different interactions, such as an interaction undoing a previously-performed user activity, an interaction to display a full email message represented by a log entry, or other interaction. Thus, interaction detector 160 illustratively detects user interaction with an entry in the activity log on the activity log page. This can be done by detecting user interaction with a user (UI) interface element (UI) that is provided by activity log page generator logic 146, and that allows the user to take an action with respect to a log entry.

In one example, the UI element is an undo UI element that can be actuated by the user to undo the action or activity reflected in the activity log entry. Thus, in one example, undo logic 162 can include flag undo logic 166, delete undo logic 168, archive undo logic 170, move undo logic 172, and other logic 174.

Flag undo logic 166 undoes a flagging operation. For instance, where the user has flagged an e-mail message, flag undo logic 166 is actuated to unflag that message.

Delete undo logic 168 undoes a delete action. For instance, where the user has deleted an e-mail message, delete undo logic 168 undoes the deletion operation and places the message back in the user's inbox (or whatever other portion of the e-mail system it resided in prior to being deleted).

Archive undo logic 170 undoes an archive operation. For instance, where a user has archived an e-mail message, archive undo logic removes that message from the archive and places it in the state it was in prior to the user performing the archive activity or action.

Move undo logic 172 undoes a move action or activity. Thus, where the user had moved an e-mail message, such as from one folder to another folder, move undo logic 172 will undo that operation and place the message back in the location where it resided prior to the move action or activity.

Of course, it will be appreciated that these are only examples of actions that can be undone. In addition, the undo functionality is only one example of a function for which a user interface element can be provided to the user on the activity log page. User interface elements can be provided to allow the user to perform other actions relative to entries in the activity log as well.

Figure 3:
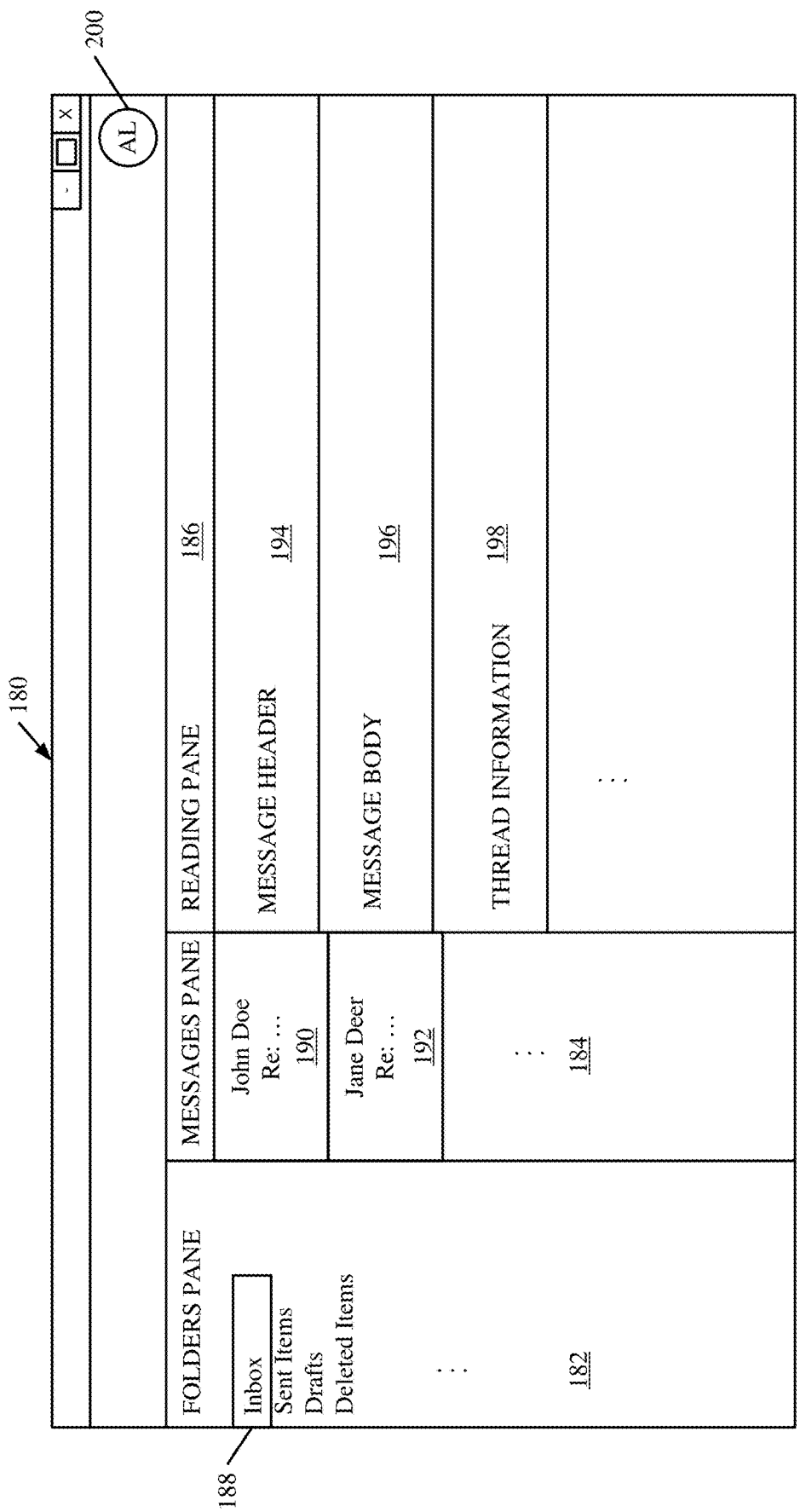
FIGS. 3-5 show examples of user interface displays.
Figure 4:
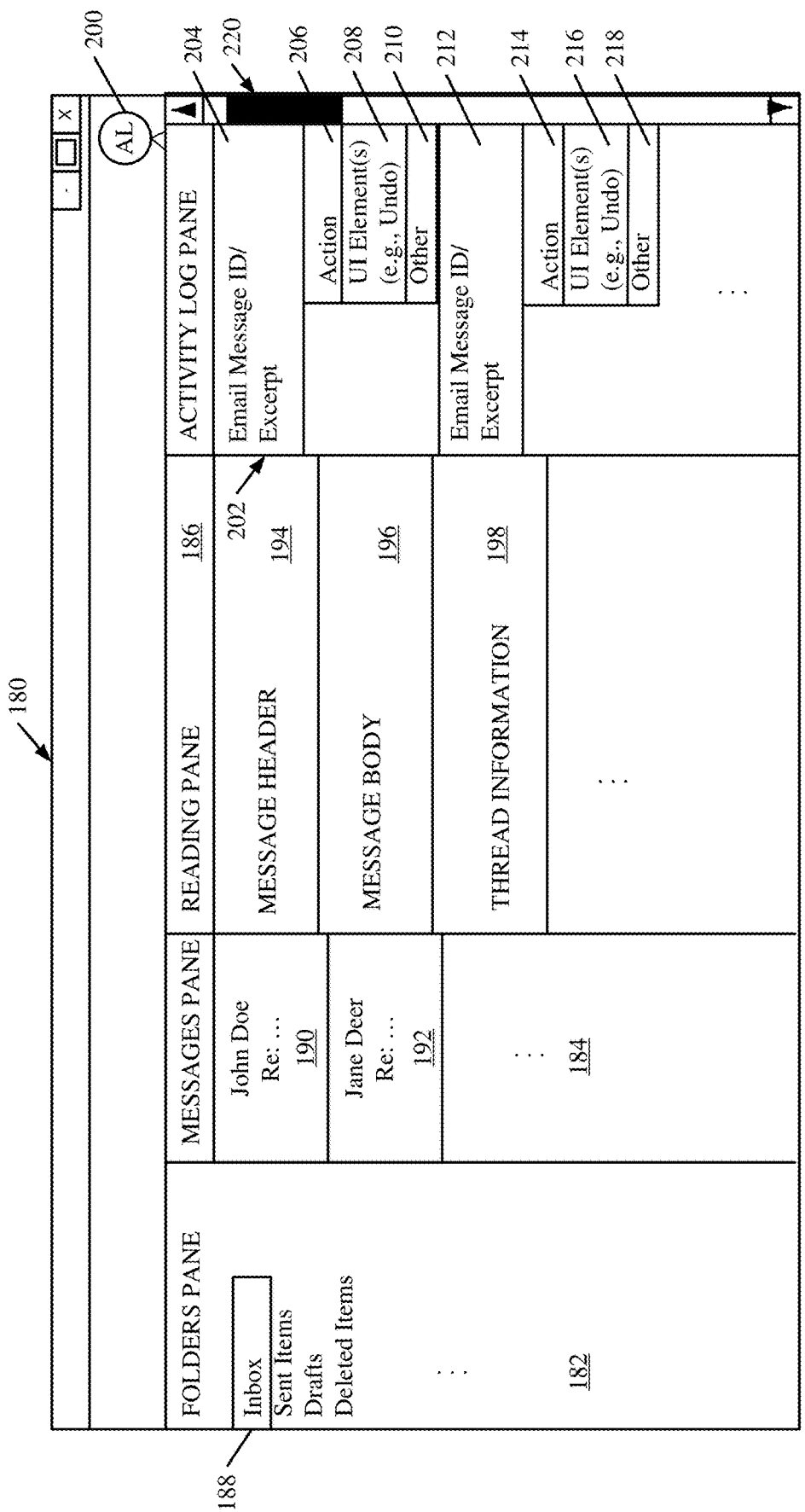
Figure 5:
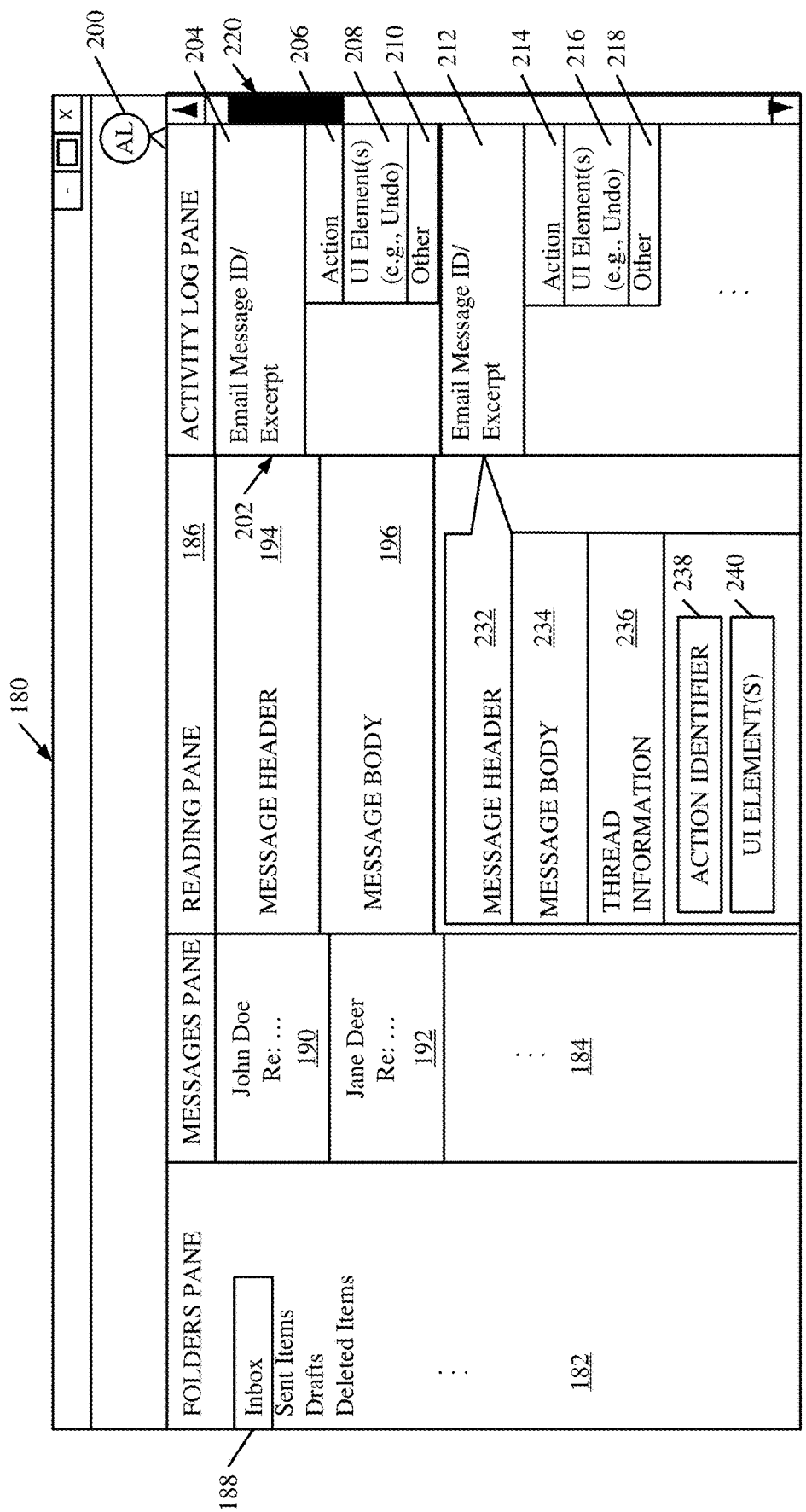

Before describing the operation of the architecture shown in FIGS. 1 and 2 in more detail, a number of user interface displays will first be described, for the sake of example. FIGS. 3-5 show examples of user interface displays that can be generated by architecture 100. Again, these are examples only and a wide variety of other user interfaces can be generated as well.

FIG. 3 shows one example of a user interface display 180 that can be generated by electronic mail system 126 and surfaced for user 112 through web browser 116. In the example shown in FIG. 3, user interface display 180 illustratively includes a folders pane 182, a messages pane 184, and a reading pane 186. Folders pane 182 illustratively displays the various folders that user 112 has set up, or that are automatically set up, in e-mail system 126. It can be seen in FIG. 3 that the "inbox" folder 188 has been selected.

Messages pane 184 displays a set of messages that are in the highlighted folder in pane 182. Therefore, in the example shown in FIG. 3, messages pane 184 shows a plurality of different messages 190-192 that reside in the user's inbox folder 188. The messages 190 and 192 are identified in messages pane 184 by message information that corresponds to a subset of the actual messages. Therefore, for example, messages 190 and 192 include the sender information, the regarding information, and they can include an excerpt or another portion of the actual message body. These are examples only.

Reading pane 186 illustratively displays the message content for a message selected in messages pane 184. The reading pane can thus display a message header 194, message body 196, thread information 198 or other information. Message header 194 illustratively includes header information for the message, such as the sender, the date and time it was sent, the regarding information, etc. Message body 196 illustratively includes message body information, and thread information 198 shows thread history, and other information regarding the message (such as messages it was in reply to, etc.).

Figure 6:
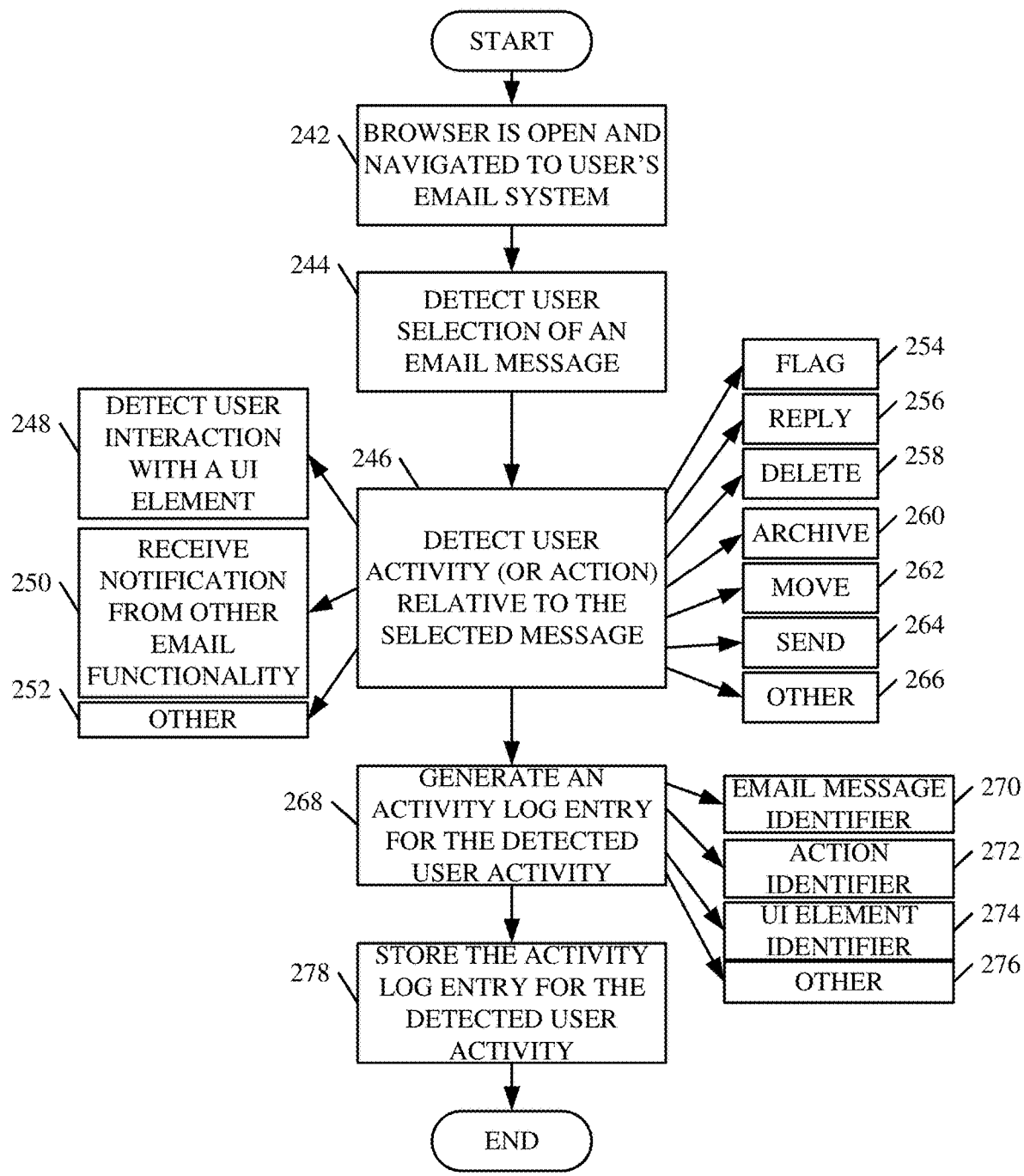
FIG. 6 is a flow diagram illustrating one example of the operation of the architecture shown in FIG. 1 in generating an activity log entry.

When the user takes action or performs an activity with respect to a message, activity logic generation system 136 (as will be described in greater detail below with respect to FIGS. 6 and 7) illustratively detects that action or activity and correlates it to the message for which the action or activity was taken. It generates an activity log entry and stores that entry in the activity log 152 in the data store 128 shown in FIG. 1.

In the example shown in FIG. 3, user interface display 180 also illustratively includes an activity log actuator 200. Actuator 200 is illustratively a user actuatable element that can be actuated by the user in order to invoke system 136 to display an activity log page showing the log entries in activity log 152 (or to otherwise let the user access the activity log 152).

FIG. 4 illustrates another example of user interface display 180. Some of the items shown in FIG. 4 are similar to those shown in FIG. 3, and they are similarly numbered. FIG. 4 shows that, because the user has actuated the activity log actuator 200, activity log page generator logic 146 has generated an activity log page or display and displayed it in activity log pane 202. In one example, activity log pane 202 displays email message identifiers corresponding to e-mails that have been acted on by user 112, and the actions that the user took, and possibly other items (as will be described in more detail below) in reverse chronological order. Therefore, the e-mail messages that have been acted on most recently are displayed on the top of activity log pane 202, while the e-mail messages that have been acted on later are displayed lower down on pane 202.

Each e-mail message, and the corresponding action, are illustratively represented by a log entry in activity log 152. Thus, a first log entry displayed on activity log pane 202 includes e-mail message identifier/excerpt 204, action identifier 206, one or more UI elements 208, and it can include other items 210. The next entry in activity log 152 includes e-mail message identifier/excerpt 212, action identifier 214, one or more UI elements 216, and it can include other items 218.

While only two activity log entries are shown in activity log pane 202, it will be appreciated that a larger number can be displayed as well. For instance, it may be that the activity log pane 202 displays the most recent 10 or 20 or 100 activity log entries. Where the number of log entries that are displayed in activity log pane 202 is too large to be displayed, pane 202 may be scrollable, using a suitable user input mechanism, such as the scroll bar 220 shown in FIG. 4.

E-mail message identifier/excerpt 204 may provide identifying information which identifies the e-mail message that is the subject of the activity log entry. For instance, it may be similar to the information displayed for message 190 in message pane 184. It may be different as well. However, in one example, it indicates the author of the message, what the message is regarding, and may include an excerpt of the message body. This is just one example and more, less or different information may be included in the e-mail message identifier/excerpt 204.

Action identifier 206 illustratively identifies to user 112 the action or activity that he or she took relative to the identified e-mail message. Action identifier 206 may be a natural language text string such as "this message was deleted" and it may identify the date and time that the action was taken. In other examples, it may identify the action in other ways as well.

UI element 208 is illustratively a user actuatable element that can be actuated by user 112 in order to take an action with respect to the corresponding activity log entry. For instance, where the action identified by action identifier 206 can be undone, then UI element 208 may be an undo actuator which can be actuated by the user 112 to undo that action with respect to the corresponding message. The UI element 208 may be another user actuatable element to perform other actions as well. The undo action is given by way of example only.

In the example discussed above, it can be seen that each activity log entry illustratively has an e-mail identifier that identifies the e-mail and an action identifier that identifies the corresponding action. The entry may also have a UI element that allows the user to perform some type of action with respect to the action or activity identified in the activity log entry. However, where the action cannot be undone, or where the user would not be permitted to perform any other type of action with respect to that activity log entry, there may be no UI element in the displayed activity log entry, or it may be greyed out indicating that it is not active, or it may be displayed in other ways as well.

In another example, the user may be able to view the full e-mail message identified by the e-mail message identifier/excerpt in the activity log entry. For instance, it may be that the user wishes to view the entire e-mail message identified by e-mail message identifier/excerpt 212 in the second activity log entry displayed in activity log pane 202. In that case, the user may double click the e-mail message identifier/excerpt 212, or otherwise select or actuate that entry. In response, interaction processing logic 148 may illustratively retrieve the entire e-mail message from the activity log 152, and display it to the user. FIG. 5 shows one example of this.

FIG. 5 is another example of user interface display 180. Some of the items are similar to those shown in FIG. 4, and they are similarly numbered. However, it can now be seen that the user has actuated the e-mail message identifier/excerpt 212 for the second activity log entry in the activity log pane 202. In response, e-mail message retrieval and surfacing logic 163 illustratively retrieves the corresponding e-mail message and generates a display to surface the content of that e-mail message for user 112, through browser 116. Thus FIG. 5 shows that the email message display 230 has now been generated on user interface display 180. The e-mail message display 230 includes a message header portion 232 for the e-mail message identified by e-mail message identifier/excerpt 212. It includes message body portion 234, thread information portion 236, and it can also include an action identifier 238 that identifies the action that was taken on the e-mail (which may be the same as action identifier 214 or different). It can also include one or more UI elements 240 which allow user 112 to perform another action or activity with respect to the e-mail message represented in display 230. This may be the same UI element as UI element 216 shown in activity log pane 204, or it may be different.

The operation of architecture 100 will now be described in more detail. FIG. 6 is a flow diagram illustrating one example of the operation of architecture 100 (shown in FIG. 1) in generating an activity log entry and storing it in activity log 152 in data store 128. It is first assumed in FIG. 6 that web browser 116 is open and that the user has navigated to the site that is hosting the user's e-mail system 126. This is indicated by block 242 in the flow diagram of FIG. 6. A user interface display, such as that shown in FIG. 3, may be generated for the user, when the user has navigated to the user's e-mail system. Of course, this is only one example of a display that may be generated and many other or different displays can be generated as well.

E-mail functionality 134 then detects that the user has selected an e-mail message from the user interface display. For instance, it may be that the user has actuated the message display 190 in the message pane 184 in FIG. 3 to indicate that the user wishes to read, reply to, or otherwise take action with respect to the corresponding e-mail message. Detecting user selection of an e-mail message is indicated by block 244 in the flow diagram of FIG. 6.

Activity identifier logic 138 then detects a user activity (or action) that the user takes relative to the selected message. This is indicated by block 246, and it can be done in a variety of different ways. For instance, in one example, it detects user interaction with a UI element (such as on user interface display 180). This is indicated by block 248. It can also receive notification from other e-mail functionality 134 that the user has taken some type of action relative to the selected e-mail message. This is indicated by block 250. It can detect the user activity or action relative to the selected message in a wide variety of other ways as well, and this is indicated by block 252.

The activities or actions can be any of a wide variety of different types of activities or actions. For instance, it may be that the user flags the e-mail as indicated by block 254. The user may also reply to the message as indicated by block 256. The user may delete or archive the message as indicated by block 258 and 260, respectively. The user may move the message or author and send a message as indicated by blocks 262 and 264, respectively. Of course, the user can perform an activity or action with respect to the selected message in a wide variety of other ways, and this is indicated by block 266.

Logging logic 142 then receives the activity identifier identified by activity identifier logic 138 and the corresponding e-mail identified by item identifier logic 140 and generates an activity log entry and stores it in activity log 152 for user 112. Generating the activity log entry for the detected user activity is indicated by block 268. The activity log entry can include a variety of different information. As discussed above with respect to FIGS. 4 and 5, it may include an e-mail message identifier portion 270, an action identifier portion 272, a UI element identifier portion 274, and it can include other items 276.

Once it is generated, logging logic 142 stores the activity log entry for the detected user activity in an activity log 152 for the user 112. This is indicated by block 278. In one example, where an activity log 152 already exists for this user, logic 142 adds the activity log entry to the activity log 152 as the most recent entry. Where an activity log has not yet been created for this user, logic 142 creates an activity log and adds the entry to the newly created activity log.

Figure 7:
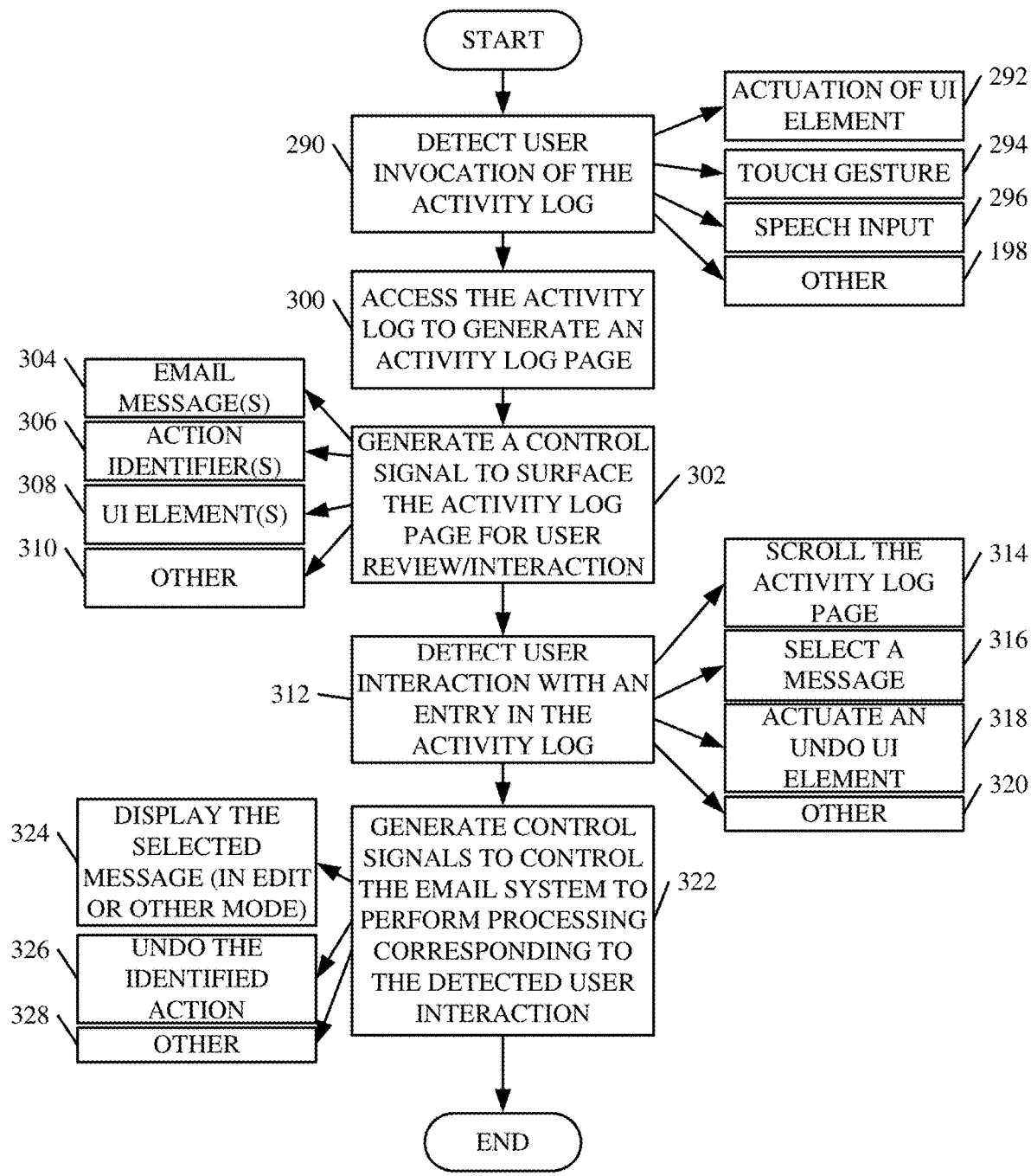
FIG. 7 is a flow diagram illustrating one example of the operation of the architecture shown in FIG. 1 in surfacing an activity page for user interaction.

FIG. 7 is a flow diagram illustrating one example of the operation of architecture 100 in allowing user 112 to invoke the activity log processing (so the user can view an activity log page) and in processing any user interactions with the activity log page. Activity log invocation logic 144 first detects user invocation of the activity log and generates an invocation signal indicative of this detected invocation. This is indicated by block 290 in the flow diagram of FIG. 7. In one example, the user actuates a user actuatable UI element, such as actuator 200 shown in FIG. 4. Actuation of a UI element is indicated by block 292 in the flow diagram of FIG. 7. In another example, the user can invoke the activity log processing using a touch gesture 294, a speech input 296, or using any of a wide variety of other inputs 298.

Activity log page generator logic 146 then accesses the activity log 152 for user 112 to generate an activity log page. This is indicated by block 300. In one example, the number of activity log entries provided to the user on the activity log page is limited to the N most recent activity log entries, where N can be pre-defined or can change dynamically. In another example, the number of log entries is limited to those that were just created during the present browser session. In yet another example, the number of log entries generated on the activity log page can be a large or unlimited number, with the most recent X entries displayed on the activity log page, but with the other log entries accessible by scrolling or otherwise manipulating the activity log page. In another example, the activity log entries that are displayed on the activity log page can be those created across multiple different browser sessions, or in other ways.

Activity log page generator logic 146 then generates a control signal to control user interface logic 130 to surface the activity log page for user 112, through web browser 116. Surfacing the activity log page for user review or interaction is indicated by block 302 in the flow diagram of FIG. 7. The activity log page can include entries identifying the e-mail messages with the e-mail message identifier as indicated by block 304. They can include the action identifiers as indicated by block 306. They can include user actuatable UI elements as indicated by block 308, or the entries can include a wide variety of other items as indicated by block 310.

User interaction processing logic 148 then detects any user interactions with the activity log page (or with any individual entries in the activity log page). This is indicated by block 312. For instance, interaction detector 160 can detect that the user has scrolled the activity log page to view additional entries. This is indicated by block 314. It can detect that the user has selected an e-mail message corresponding to one of the activity log entries, such as by double clicking on an e-mail message identifier/excerpt as described above. Selecting a message in this way is indicated by block 316. It can detect that the user has actuated one of the UI elements, such as an undo UI element, as indicated by block 318. It can detect user interactions in a variety of other ways as well, and this is indicated by block 320.

Interaction processing logic 148 then generates control signals to programmatically control email functionality 134 in email system 126 to perform processing corresponding to the detected user interaction. This is indicated by block 322. For instance, where the user has selected a message for display, e-mail message retrieval and surfacing logic 163 illustratively controls email system 126 to retrieve the full e-mail message content and display the selected message for the user (such as shown in FIG. 5 above). In one example, it can display the message in edit mode so that the user can edit the message, or it can display the message in other modes as well. Displaying the selected message is indicated by block 324 in the flow diagram of FIG. 7.

In another example, undo logic 162 can generate control signals to programmatically control email functionality 134 in email system 126 to undo the identified action, based upon the detected user interaction with one of the UI elements. This is indicated by block 326. By way of example, if the action was to flag the e-mail message, and the user actuated the undo actuator, then flag undo logic 166 can generate control signals to control email system 126 to un-flag the message. If the action was to delete the message, then delete undo logic 168 can generate control signals to control email system 126 to reverse that action. If the action was to archive or move the message, then archive undo logic 170 or move undo logic 172 can generate control signals to control email system 126 to undo those actions as well.

In generating control signals to control email system 126, it may be that the email functionality 134 exposes one or more application programming interfaces (APIs) that can be called by logic 148 to perform the desired action. The control signals can be generated and used in other ways as well.

It will be appreciated that the interaction processing can take other forms as well. This is indicated by block 328.

It can thus be seen that the present discussion addresses difficulties associated with maintaining and surfacing an e-mail activity log through a web-based e-mail system. The present discussion overcomes the difficulties associated with using backstacking in a web browser 116 in order to accomplish this. It also improves the accuracy, usability, and flexibility of the system. Because the activity log is detected and generated by the e-mail system itself, or by a service separate from but accessed by the e-mail system, changes to web browser 116 do not affect usage or maintenance of the activity log. Similarly, if changes are made to the activity log, so long as they are accessible by web browser 116, those changes will be incorporated and surfaced for the user. All of this increases the flexibility in the design and development of the system, and it greatly enhances the usability of the system for the user. It also adds features previously unavailable in web-based systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
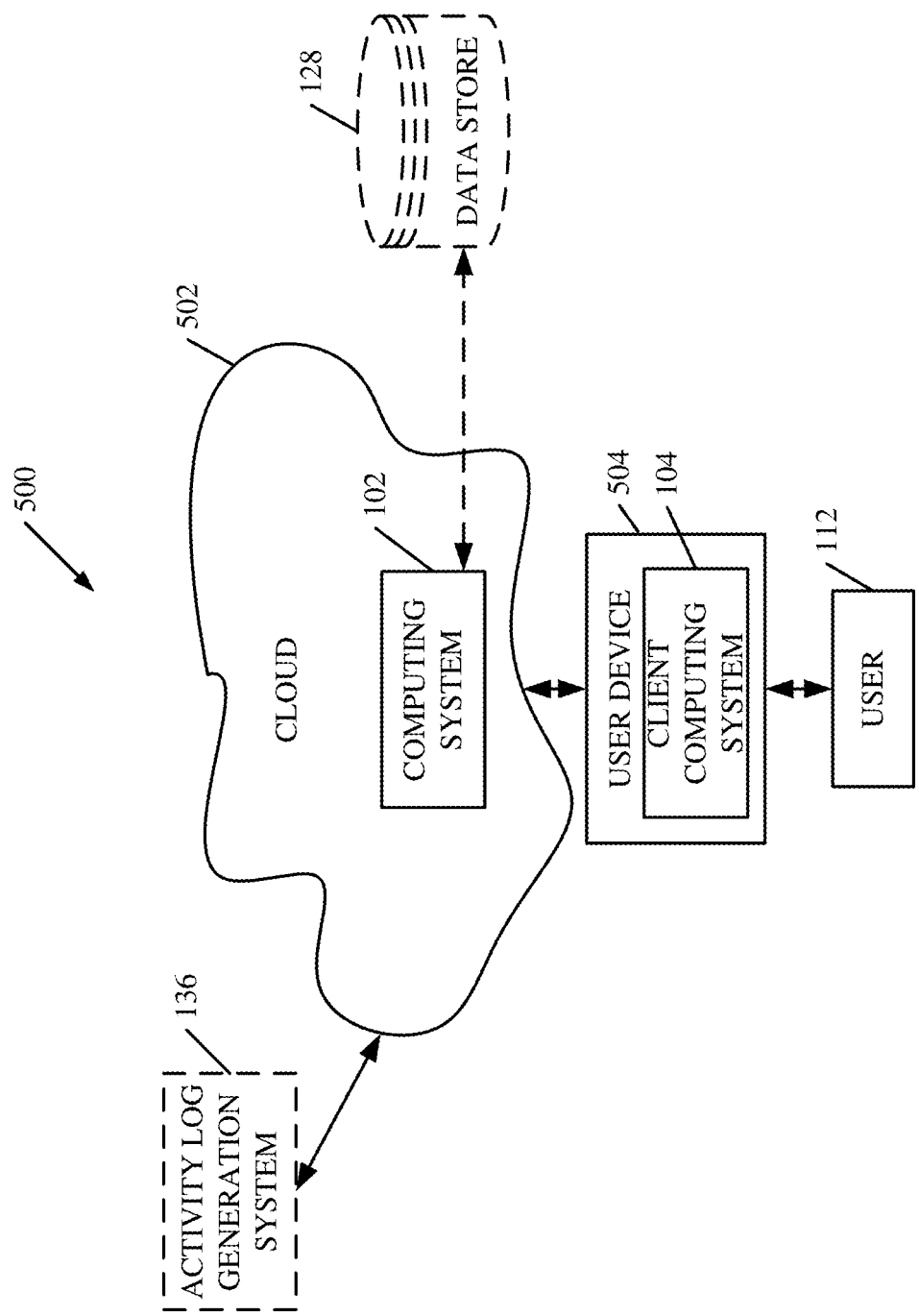
FIG. 8 is a block diagram showing one example of the architecture illustrated in FIG. 1, deployed in a cloud computing architecture.

FIG. 8 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 1 and they are similarly numbered. FIG. 8 specifically shows that computing system 102 can be located in cloud 502 (which can be public, private, or a combination where portions are public while others are private). Therefore, user 112 uses a user device 504 that includes client computing system 104 to access those systems through cloud 502.

FIG. 8 also depicts another example of a cloud architecture. FIG. 8 shows that it is also contemplated that some elements of computing system 102 can be disposed in cloud 502 while others are not. By way of example, data store 128 can be disposed outside of cloud 502, and accessed through cloud 502. In another example, activity log generation system 136 can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
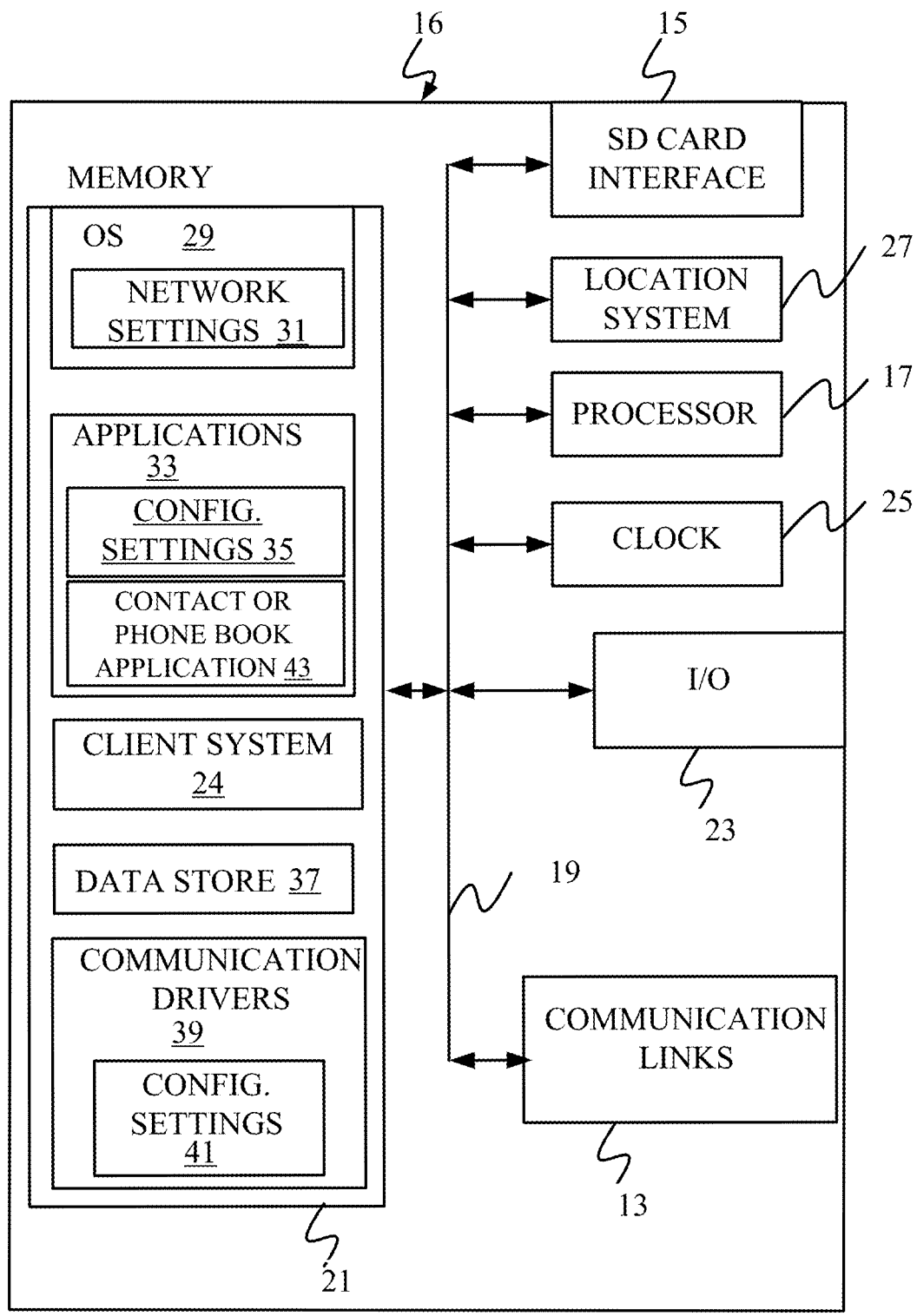
FIGS. 9-11 show examples of mobile devices that can be used in the architectures shown in the previous figures.
Figure 10:
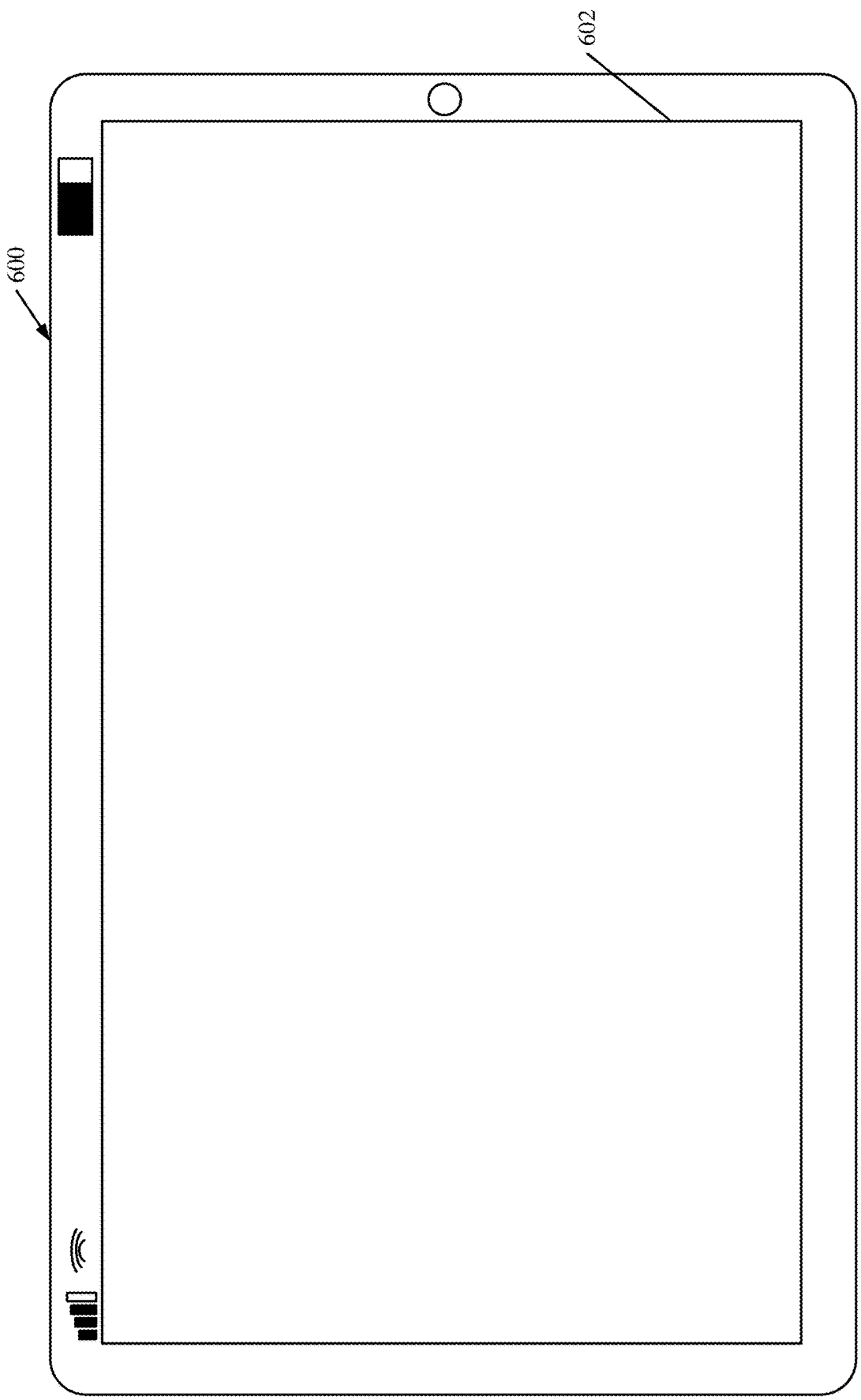
Figure 11:
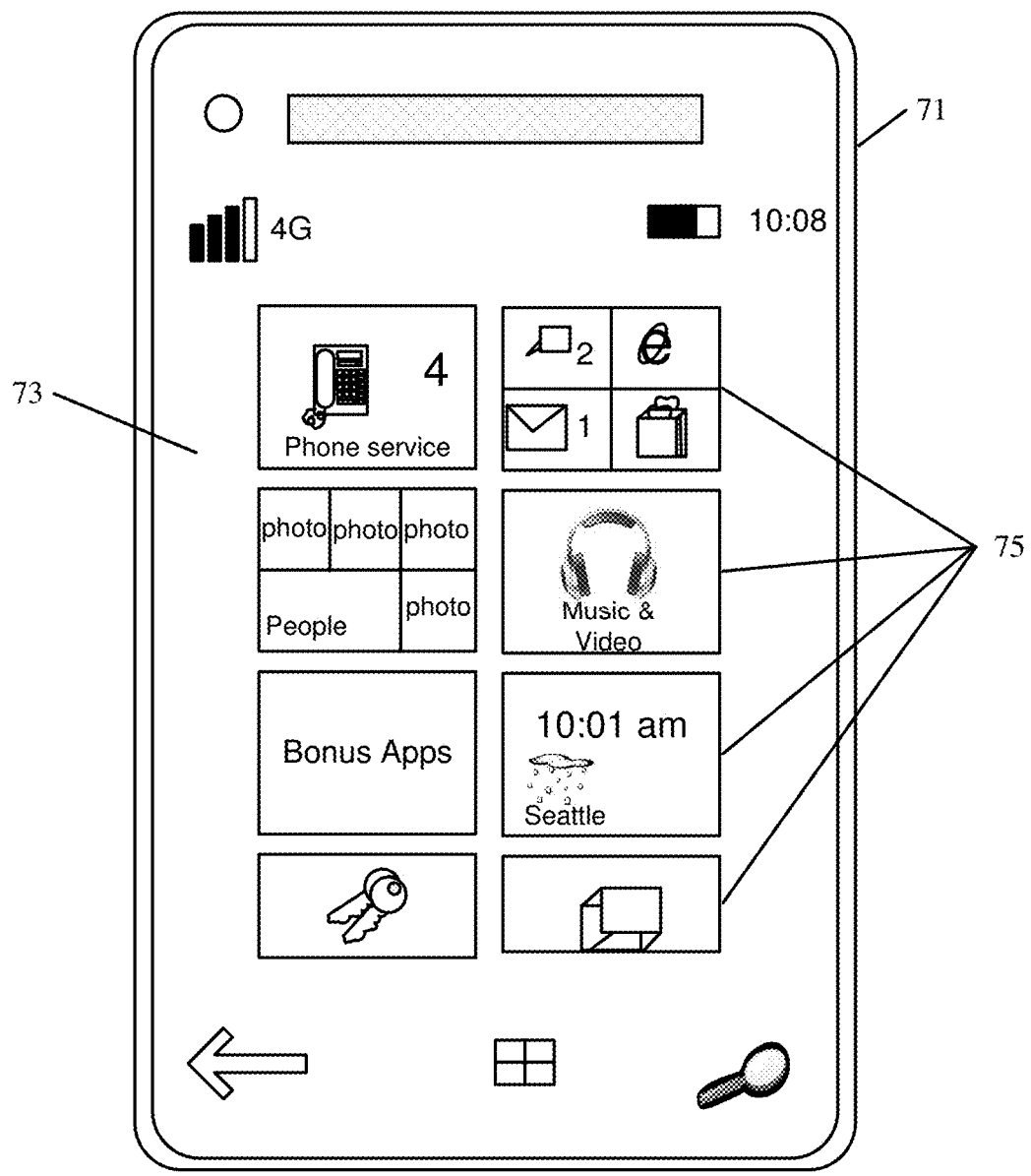

FIG. 9 is a simplified block diagram of one illustrative example of a handheld or mobile computing device that can be used as a user's or client's hand held device 16, in which the present system (or parts of it) can be deployed. FIGS. 10-11 are examples of handheld or mobile devices.

FIG. 9 provides a general block diagram of the components of a client device 16 that can run components of client computing system 104 or that otherwise interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 114 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts of computing system 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 10 shows one example in which device 16 is a tablet computer 600. In FIG. 10, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
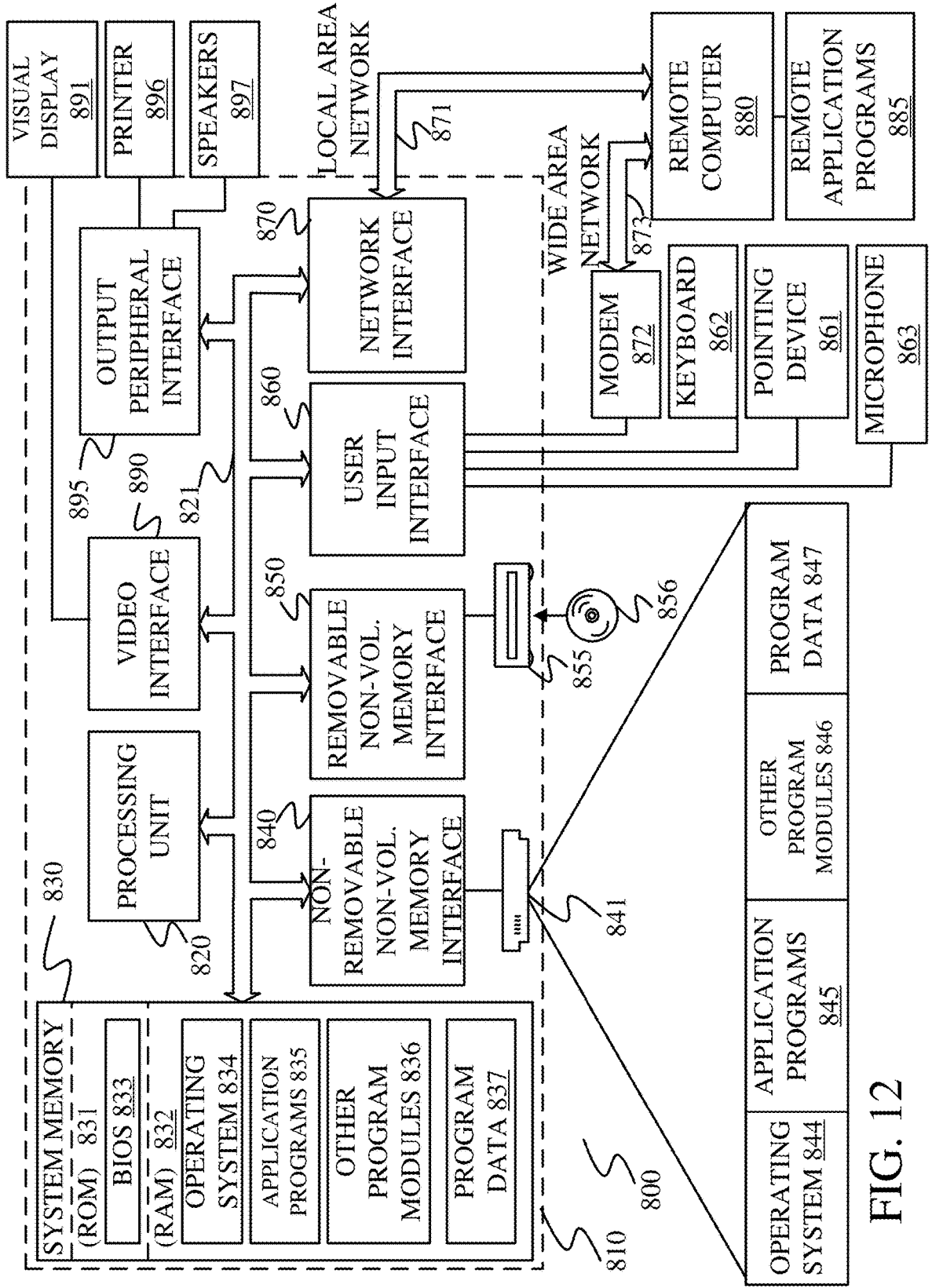
FIG. 12 is a block diagram showing one example of a computing environment that can be used in the architectures shown in the previous figures.

FIG. 12 is one example of a computing environment in which architecture 100, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processors or servers 114 or 124), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

an electronic mail (email) system that is user accessible to perform a plurality of different types of activities relative to an email message;

an activity log generation system that generates an activity log that has log entries, activity log generation system generating each log entry to identify an activity taken relative to a corresponding email message and to identify the corresponding email message, the activity log generation system generating a log entry in the activity log for each of the plurality of different types of activities taken relative to different corresponding email messages, at least one log entry including a user interface element that is user actuatable to perform an action relative to the log entry; and user interface logic that generates a control signal to control surfacing of the activity log.

Example 2 is the computing system of any or all previous examples wherein the email system is a web-based email system that is user accessible through a web browser and wherein the activity log generation system comprises:

activity identifier logic configured to identify a detected user activity taken relative to a given corresponding email message.

Example 3 is the computing system of any or all previous examples wherein the activity log generation system comprises:

item identifier logic configured to identify the given corresponding email message.

Example 4 is the computing system of any or all previous examples wherein the activity log generation system comprises:

logging logic configured to generate a corresponding activity log entry, in the activity log, that identifies the detected user activity performed relative to the given corresponding email message, the web-based email system being configured to expose the activity log through the user interface logic and the web browser.

Example 5 is the computing system of any or all previous examples and further comprising:

activity log invocation logic configured to detect user invocation of the activity log, corresponding to the user, through the web browser, and generate an invocation signal indicative of the detected user invocation.

Example 6 is the computing system of any or all previous examples wherein the web-based email system generates an email user interface display with an activity log actuator that is actuatable to invoke the activity log corresponding to the user.

Example 7 is the computing system of any or all previous examples and further comprising:

activity log page generator logic that receives the invocation signal from the activity log invocation logic and generates an activity log display showing log entries in the activity log generated based on detected user activity of the user.

Example 8 is the computing system of any or all previous examples wherein the activity log page generator logic generates the activity log display with log entries that were generated across a plurality of different browser sessions of the web browser.

Example 9 is the computing system of any or all previous examples wherein the activity log page generator logic generates the activity log display with N most recent log entries arranged on the activity log display in order of recency.

Example 10 is the computing system of any or all previous examples wherein the UI element comprises an undo actuator and further comprising:

interaction processing logic configured to control the email system to undo the activity taken relative to the corresponding email message in response to user actuation of the undo actuator.

Example 11 is the computing system of any or all previous examples wherein the UI element comprises a retrieval actuator and further comprising:

interaction processing logic configured to control the email system to retrieve and surface full email content for email message identified in the log entry.

Example 12 is a computer-implemented method, comprising:

exposing, user accessible electronic mail (email) functionality to perform a plurality of different types of activities relative to an email message;

generating an activity log that has log entries, each log entry identifying an activity taken relative to a corresponding email message and identifying the corresponding email message, the activity log having a log entry generated in the activity log for each of the plurality of different types of activities taken relative to different corresponding email messages, at least one log entry including a user interface element that is user actuatable to perform an action relative to the log entry; and generating a control signal to control surfacing of the activity log. Example 13 is the computer-implemented method of any or all previous examples exposing comprises exposing the user accessible email functionality through a web browser and wherein generating the activity log comprises:

identifying a detected user activity taken relative to a given corresponding email message; and identifying the given corresponding email message.

Example 14 is the computer-implemented method of any or all previous examples wherein generating the activity log comprises:

generating a corresponding activity log entry, in the activity log, that identifies the detected user activity performed relative to the given corresponding email message, and further comprising exposing the activity log through the web browser.

Example 15 is the computer-implemented method of any or all previous examples and further comprising:

detecting user invocation of the activity log, corresponding to the user, through the web browser;

generating an invocation signal indicative of the detected user invocation; and generating an activity log display showing log entries in the activity log generated based on detected user activity of the user.

Example 16 is the computer-implemented method of any or all previous examples wherein generating the activity log display comprises:

generating the activity log display with log entries that were generated across a plurality of different browser sessions of the web browser.

Example 17 is the computer-implemented method of any or all previous examples wherein the UI element comprises an undo actuator and further comprising:

controlling the email functionality to undo the activity taken relative to the corresponding email message in response to user actuation of the undo actuator.

Example 18 is the computer-implemented method of any or all previous examples wherein the UI element comprises a retrieval actuator and further comprising:

controlling the email functionality to retrieve and surface full email content for email message identified in the log entry.

Example 19 is a computing system, comprising:

a web-based electronic mail (email) system that is user accessible through a web browser to perform a plurality of different types of activities relative to an email message;

activity identifier logic that identifies any detected user activity, of a plurality of different types of user activity, taken relative to a given corresponding email message;

item identifier logic that identifies the given corresponding email message;

logging logic that generates a corresponding activity log entry, in an activity log, that identifies the detected user activity performed relative to the given corresponding email message, the log entry including a user interface element that is user actuatable to perform an action relative to the log entry, the web-based email system being configured to expose the activity log through the web browser; and interaction processing logic configured to control the email system to undo the activity taken relative to the corresponding email message in response to user actuation of the user interface element.

Example 20 is the computing system of any or all previous examples and further comprising:

activity log page generator logic configured to receive an invocation signal from activity log invocation logic and generate an activity log display showing log entries in the activity log generated across a plurality of different browser sessions of the web browser based on detected user activity of the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
   at least one processor; and
   memory storing instructions executable by the at least one processor, wherein the instructions, when executed, cause the computing system to:
   generate an activity log comprising activity log entries representing a plurality of different types of activities performed by an electronic mail (email) system relative to email messages, wherein each activity log entry comprises:
   an activity identifier that identifies an activity performed relative to a corresponding one of the email messages, that corresponds to the activity log entry; and
   a message identifier that identifies the corresponding email message; and
   generate a user interface that includes a user interface element representing at least one of the activity log entries in the activity log, the user interface element including an indication of the corresponding activity and message identifiers, that correspond to the at least one activity log entry, wherein the user interface element is actuatable to perform an action relative to the at least one activity log entry.

2. The computing system of claim 1, wherein the email system is a web-based email system that is user-accessible through a web browser and wherein, the instructions cause the computing system to:
   identify a particular one of the activities taken relative to a particular one of the email messages and to generate the activity identifier that identifies the particular activity.

3. The computing system of claim 2, wherein the instructions cause the computing system to:
   identify the particular email message and generate the message identifier that identifies the particular email message.

4. The computing system claim 3, wherein the instructions cause the computing system to:
   generate a corresponding activity log entry, in the activity log, that identifies the particular: activity performed relative to the particular email message,
   the web-based email system being configured to expose the user interface through the web browser.

5. The computing system of claim 4, wherein the instructions cause the computing system to:
   detect user actuation of an activity log display element, that represents the activity log on the user interface display; and
   based on the detected user actuation of the activity log display element, display the user interface element representing the at least one activity log entry.

6. The computing system of claim 5, wherein the instructions cause the computing system to:
   based on the detected user actuation of the activity log display element, generate an activity log display showing log entries in the activity log generated based on detected user activity corresponding to the user.

7. The computing system of claim 2, wherein the instructions cause the computing system to generate the activity log with activity log entries that were generated across a plurality of different browser sessions of the web browser.

8. The computing system of claim 7, wherein the instructions cause the computing system to generate the user interface with a set of user interface elements that represent the N most recent activity log entries arranged in order of recency.

9. The computing system of claim 1, wherein the user interface element comprises an undo actuator, and the instructions cause the computing system to:
   in response to user actuation of the undo actuator, control the email system to undo the activity taken relative to the corresponding email message, that corresponds to the at least one activity log entry.

10. The computing system of claim 1, wherein the user interface element comprises a retrieval actuator, and the instructions cause the computing system to:
    control the email system to retrieve and surface full email content for the corresponding email message, that corresponds to the at least one activity log entry.

11. A method performed by a computing system, the method comprising:
    generating an activity log comprising activity log entries representing a plurality of different types of activities performed by an electronic mail (email) system relative to email messages, wherein each activity log entry comprises:
    an activity identifier that identifies an activity performed relative to a corresponding one of the email messages, that corresponds to the activity log entry; and
    a message identifier that identifies the corresponding email message; and
    generating a user interface that includes a user interface element representing at least one of the activity log entries in the activity log, the user interface element including an indication of the corresponding activity and message identifiers, that correspond to the at least one activity log entry, Wherein the user interface element is actuatable to perform an action relative to the at least one activity log entry.

12. The method of claim 11, wherein the email system comprises a web-based email system that is user accessible through a web browser, and wherein generating the activity log comprises:
identifying a detected user activity taken relative to a particular one of the email messages.

13. The method of claim 12, wherein generating the activity log comprises:
generating a corresponding activity log entry, in the activity log, that identifies the detected user activity performed relative to the particular email message, and further comprising exposing the user interface through the web browser.

14. The method of claim 13, and further comprising:
detecting user actuation of an activity log display element, that represents the activity log on the user interface display; and
based on the detected user actuation of the activity log display element, displaying the user interface element representing the at least one activity log entry.

15. The method of claim 12, wherein generating the activity log comprises:
generating the activity log with activity log entries that were generated across a plurality of different browser sessions of the web browser.

16. The method of claim 11, wherein the uses interface element comprises an undo actuator and further comprising:
controlling the email functionality to undo the activity taken relative to the corresponding email message in response to user actuation of the undo actuator.

17. The method of claim 11, wherein the user interface element comprises a retrieval actuator and further comprising:
controlling the email functionality to retrieve and surface full email content for email message identified in the activity log entry.

18. A computing system comprising:
at least one processor; and
memory storing instructions executable by the at least one processor, wherein the instructions, when executed, provide:
an activity log generator configured to:
generate an activity log comprising activity log entries representing a plurality of different types of activities performed by, an electronic mail (email) system relative to email messages,
wherein each activity log entry comprises:
an activity identifier that identifies an activity performed relative to a corresponding one of the email messages, that corresponds to the activity log entry; and
a message identifier that identifies the corresponding email message; and
a user interface component configured to:
generate a user interface that includes a user interface element representing at least one of the activity log entries in the activity log, the user interface element including an indication of the corresponding activity and, message identifiers, that correspond to the at least one activity log entry, wherein the user interface element is actuatable to perform an action relative to the at least one activity log entry.

19. The computing system of claim 18, wherein the email system is a web-based email system that is user-accessible through a web browser and wherein the activity log generator is configured to:
identify a particular one of the activities taken relative to a particular one of the email messages and to generate the activity identifier that identifies the particular activity.

20. The computing system of claim 19, wherein the activity log generator is configured to:
identify the particular email message and generate the message identifier that identifies the particular email message.

* * * * *